US008938504B2

(12) United States Patent
Sklarski et al.

(10) Patent No.: US 8,938,504 B2
(45) Date of Patent: Jan. 20, 2015

(54) FORMING NETWORKS OF USERS ASSOCIATED WITH A CENTRAL ENTITY

(75) Inventors: Tsafrir Sklarski, Beer Yaakov (IL); Nir Koren, Raanana (IL); Ravit Huber, Holon (IL)

(73) Assignee: SAP Portals Israel Ltd, Ra'anana (IL)

( * ) Notice: Subject to any disclaimer, the term of this patent is extended or adjusted under 35 U.S.C. 154(b) by 313 days.

(21) Appl. No.: 13/451,220

(22) Filed: Apr. 19, 2012

(65) Prior Publication Data
US 2013/0282805 A1  Oct. 24, 2013

(51) Int. Cl.
*G06F 15/16*     (2006.01)
*G06F 3/048*     (2013.01)

(52) U.S. Cl.
USPC .......................................... 709/205; 715/862

(58) Field of Classification Search
USPC .................. 709/204, 205; 706/50; 715/862
See application file for complete search history.

(56) References Cited

U.S. PATENT DOCUMENTS

| 2010/0223335 A1* | 9/2010 | Fu et al. ................. 709/205 |
| 2012/0042013 A1* | 2/2012 | Roman et al. ............. 709/204 |
| 2012/0158637 A1* | 6/2012 | Kshetramade et al. ....... 706/50 |
| 2012/0290950 A1* | 11/2012 | Rapaport et al. .......... 715/753 |

OTHER PUBLICATIONS

U.S. Appl. No. 12/970,474, filed Dec. 16, 2010, Yassin et al.

* cited by examiner

*Primary Examiner* — Shirley Zhang
(74) *Attorney, Agent, or Firm* — Fish & Richardson P.C.

(57) ABSTRACT

Computer-implemented methods, computer-readable media, and systems for forming networks of users associated with a central entity. When a central entity receives multiple requests from multiple users to register for an event associated with the entity, the entity forms a user network that did not exist until then. The entity receives data describing the users using which the entity generates user interfaces showing all users in the network, and presents the user interfaces on users' computer systems. When a subset of the users check-in with the entity, the entity displays information about one of the users in the subset to another, and allows the users to communicate with each other. When the event associated with the entity ends, the entity terminates the network. In this manner, the central entity forms temporary user networks that expire when an event scheduled at the central entity occurs.

11 Claims, 7 Drawing Sheets

FORMING NETWORKS OF USERS ASSOCIATED WITH A CENTRAL ENTITY

TECHNICAL FIELD

The present disclosure relates to software, computer systems, and computer-implemented methods for forming user networks.

BACKGROUND

Computer systems, such as desktop computers, laptop computers, smartphones, tablet computers, personal digital assistants, and the like, can be configured to be connected to other computer systems over wired or wireless networks, for example, the Internet. Using computer systems connected to each other, users of computer systems can form a network, for example, a social network, and share information with each other. The infrastructure of such a network can be implemented on one or more computer systems, which can execute computer software applications that perform operations. The operations can allow a user to connect to the network using a client computer system, to create a user account, to store data associated with the user in the user account, and to provide a profile of the user that presents the data. To perform one or more of these operations, the computer systems can provide user interfaces with which the user can interact to provide and view data associated with the user and other users. The computer systems can additionally provide client-side computer software applications that can be executed by a variety of client computer systems including desktop computers and mobile devices, such as, tablet computers, laptop computers, mobile phones, and the like. The user can access the network, and particularly, the user's account on the network, through user interfaces provided by the client-side applications. In some situations, the operations performed by the computer software applications include providing functionalities based on a user's geographic location, which the computer systems can obtain from the user, for example, from a Global Positioning System (GPS) executing on the user's client computer system.

SUMMARY

The present disclosure involves systems, software, and computer-implemented methods for forming networks of users associated with a central entity.

In general, one innovative aspect of the subject matter described here can be implemented as a computer-implemented method performed by one or more data processing apparatus. Multiple requests are received at a computer system from multiple users. Each request is a request to form a respective association with the computer system, and includes data associated with a respective user of the plurality of users. In response to receiving the multiple requests, a network is created at the computer system. The network includes the multiple users. Data associated with each user of the multiple users is stored at the computer system. That each user of a subset of users of the network has performed a common operation at the computer system is detected. In response, at least a portion of data associated with at least one user of the subset is provided to at least one other user of the subset.

This, and other aspects, can include one or more of the following features. The computer system can be associated with a central entity to which each user of the multiple users sends each request to form the respective association. The central entity can be an event scheduled to occur at a geographic location. The common operation can include transmitting a registration request using a mobile device to the computer system associated with the central entity. It can be determined that a first user and a second user have transmitted respective registration requests to the computer system. A first distance of the first user and a second distance of the second user from a common geographic location can be displayed on a mobile device associated with the first user. The network can be terminated after an expiration of the event. A functionality to transmit communications to and receive communications from a second computer system associated with a second user can be executed on a first computer system associated with a first user. A user interface that displays multiple objects connected to a common object can be generated at the computer system. Each of the multiple objects can represent a user of the network. The user interface can be provided in response to receiving the request for the user interface from a mobile device of a user of the network. An image associated with each user can be displayed in a respective object that represents each user. An advertisement selected based on stored data associated with the particular user can be presented to the user. The data associated with each user can include one or more of an age, a geographic location, demographic data, or user interest.

Another aspect of the subject matter described here can be implemented as a non-transitory computer-readable medium tangibly encoding computer program instructions executable by data processing apparatus to perform operations described here. The operations include receiving, at a computer system associated with a central entity, multiple requests from a respective multiple users. Each request is a request to form a respective association with the central entity, and each request includes data associated with a respective user. Each user is associated with a respective mobile device. In response to receiving the multiple requests, a network associating the plurality of users with the central entity is created at the computer system. Data associated with each user of the multiple users is stored at the computer system. A notification is received at the computer system from a particular mobile device associated with a particular user of a subset of users of the network. The notification triggers a connection between the computer system and the particular mobile device. In response to receiving the notification, multiple functionalities are executed by the computer system at the mobile device. The multiple functionalities communicate at least a portion of data associated with at least one other user of the subset to the particular user.

This, and other aspects, can include one or more of the following features. A termination event at the central entity can be detected at the computer system. In response to detecting the termination event, the network can be terminated. The central entity can be an event scheduled to occur at a geographical location. The termination event can be an end of the event. A request from the particular user to form a respective association with the central entity can include a request from the particular user to register for the event. A notification from the particular mobile device associated with the particular user can include a notification to check-in the registered particular user to the event. It can be determined that a first user and a second user have each transmitted a respective request to form a respective association with the central entity. A first distance of the first user and a second distance of the second user from the central entity can be displayed on a first mobile device associated with the first user. A functionality to transmit communications to and receive communications from a second mobile device associated with the second user can be executed on the first mobile device. The data associated with each user can include one or more of an age, a geographic location, demographic data, or user interest.

A further aspect of the subject matter described here can be implemented as a system including one or more data processing apparatus, and a non-transitory computer-readable medium tangibly storing computer program instructions executable by the one or more data processing apparatus to perform the operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
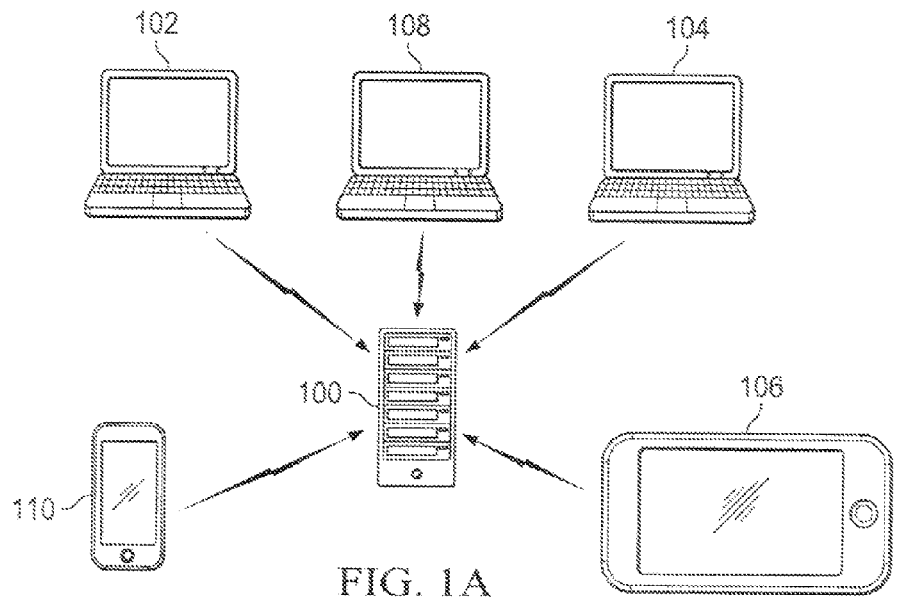
FIGS. 1A and 1B illustrate an example computer systems environment that includes a network of computer systems and a central entity.

This disclosure describes computer-implemented methods, computer-readable media, and computer systems for forming networks of users associated with a central entity. In some situations, an event associated with the central entity can be scheduled to occur at a scheduled time. After the event has been scheduled, the central entity or organizers of the event (or both) can communicate notifications that the event is scheduled to occur. By executing one or more computer software applications using central computer systems described below, the central entity can provide notifications, for example, through one or more webpages of a website, electronic mail (e-mail) messages, electronic newsletters, or combinations of them. Through the notifications, the central entity can solicit recipients of the notification to participate in the event at the scheduled time.

Upon receiving the notification, multiple users can form the multiple associations with the event. Using respective user computer systems described below, multiple users can register to participate in the event at the scheduled time using the webpage of the website. When the multiple users form the respective associations, the central computer systems can form a network that includes the central entity and each of the multiple users. The central computer systems can form the network such that the central entity is connected to each user in the network for as long as the duration exists. The central computer systems can enable one or more users of the network to establish connections with one or more other users of the network either directly or through the central entity. The central computer systems can begin to form the network as requests to form associations are received from the user computer systems. Alternatively, the central computer systems can store a deadline to receive requests to form associations from user computer systems and form the network when the deadline expires. The network of users who have formed associations may not exist prior to the central computer systems forming the network.

Each user can share data describing the respective user with the central entity. The data can include a geographic location associated with the user. For example, the central computer systems can provide forms—for example, electronic forms implemented in webpages—that can be displayed in user interfaces on user computer systems. Each user can provide the data to the central entity through the user interfaces. Alternatively, each user can store a profile including the data on a computer system, and can provide the profile to the central computer system together with the request to form the association. In another example, the central computer systems may have created and stored a profile of data for a particular user in the past, and can access the profile upon determining that the particular user has requested to form an association with the central entity. In this manner, the central entity can obtain data describing the users in the network.

Subject to users' permissions, the central entity can share at least a portion of data describing a user with other users in the network. As described below, the central computer systems can generate multiple user interfaces that can be displayed at user computer systems, and through each user interface communicate different types of data to each user. The central computer systems can additionally provide functionalities using which two users of the network can communicate with each other using respective user computer systems. Based on data describing a particular user, the central computer systems can cause content, for example, advertisements or other content items of interest, to be presented to the particular user on a respective user computer system. The central computer systems can either generate the content or receive the content from one or more of the other users, or from a third party outside the network. Further, based on a history of interactions of users with the central entity and with each other, the central computer systems can determine a behavior of a user or users in the network.

The central computer systems can detect a termination event, for example, an end of the event associated with the central entity, an expiration of the time at which the event was scheduled to occur, or the like. When the central computer systems detect the termination event, then the central computer systems can terminate the network of users. Terminating the network of users can include ending each association formed between each user and the central entity, and ceasing to provide the user interfaces through which user computer systems could previously interact with the central computer systems or with each other (or both). In some implementations, the central computer systems can store the data describing the users in the network even after having terminated the network.

In this manner, the central entity can form a temporary, ad hoc network at a first time and terminate the network at a second, subsequent time. While the network exists, the central entity can allow users connected to the network to communicate with the central entity or with each other or both. For example, the central computer systems can provide computer software applications executable on a range of user computer systems—for example, desktop computers, laptop computers, tablet computers, mobile devices, smart phones, and the like—that enable users of the network to communicate with the central entity and with each other using various user computer systems. As described below, several of the functionalities that the computer software applications can provide can be based on a geographic location of a user that the central computer systems can determine using the user computer systems with which the users access the central computer systems. Once the network has been terminated, the users of the network may no longer be able to communicate with each other through the central entity.

Examples of a central entity include an event, a person, a geographical location or any entity with which multiple users can form respective associations. For example, the central entity can be a convention center and the event can be a conference proceeding scheduled to occur at the convention center. The conference itself can be the central entity and a conference organizer can check attendees' roles and send notifications about interesting sessions to interested attendees based on their roles. In another example, the central entity can be a person and the event can be a social event scheduled to occur at the person's residence or another geographic location. In a further example, the central entity can be a shopping mall that includes multiple stores and the event can be a sale event occurring at the shopping mall or in one or more of the stores.

Figure 1B:
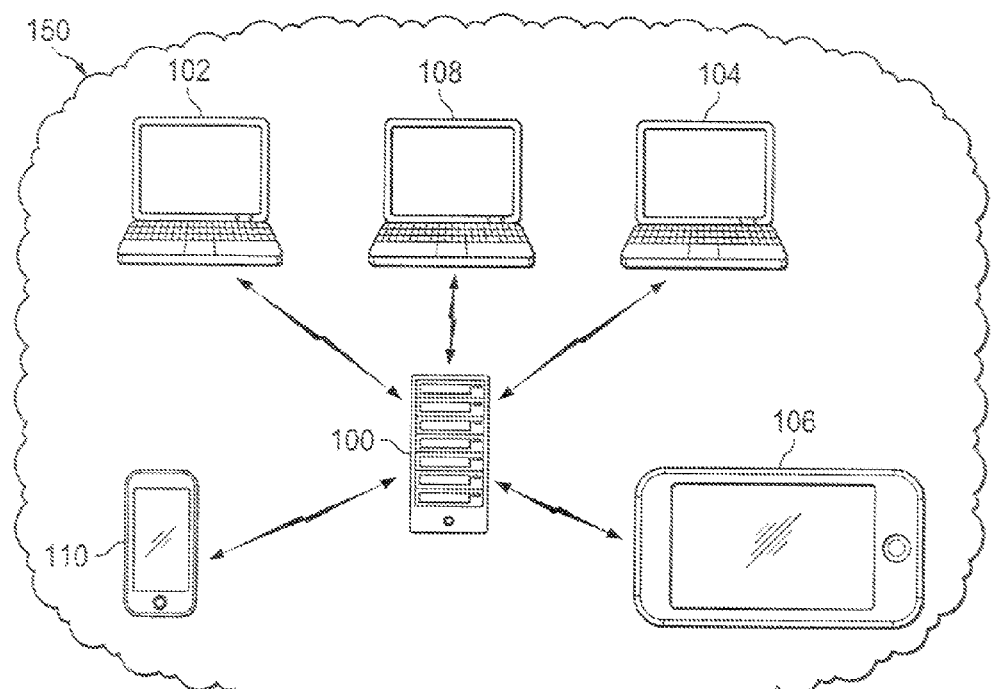

FIGS. 1A and 1B illustrate an example computer systems environment that includes a network of user computer systems and a central computer system associated with a central entity. As described with reference to FIG. 2, the central entity is associated with a central computer system 100, which can be a single computer system or multiple distributed computer systems (for example, computer system 100A, computer system 100B, and computer system, 100C) that executes one or more computer software applications to perform the operations described here. In some implementations, as shown in FIG. 1A, the central computer system 100 can receive multiple requests from multiple user computer systems, each of which is operated by a user. Each request can be a request to form a respective association with the central computer system 100. The user computer systems can include, for example, a first user system 102, a second user system 104, a third user system 106, a fourth user system 108, a fifth user system 110, and the like. Each user computer system is configured to connect to the central computer system 100 through one or more wired or wireless networks (not shown), for example, the Internet.

In some situations, the central computer system 100 can transmit a notification to each user system, and responsively receive a request from each user system. For example, the central computer system 100 can present a website at each user system notifying each user of the central entity and providing functionality to each user to connect to the central entity using the website. In an example in which the central entity is a person, the person can transmit a message (such as, an e-mail message) using the central computer system 100 to each user system notifying each user of an event associated with the person. Each user can transmit a response to the message to the central computer system 100 using a respective user system. In another example, the central computer system 100 can notify each user of an event scheduled to occur at the central entity at a later date—via e-mail or through a website or combinations of them—in response to which each user can register for the event using the respective computer system.

As shown in FIG. 1B, the central computer system 100 receives the multiple requests from the user systems and, in response, creates a network 150 including the multiple users. The central computer system 100 can provide users in the network 150 access to data about the central entity, for example, details describing the geographical location of the central entity, details about the event scheduled to occur at the central entity, and the like. The users can access the data using the respective user systems. Also, through respective user systems, users can provide data associated with the users to the central computer system 100. The data describing a user can include one or more of an age of the user, a geographic location associated with the user, a geographic location of the user computer system, demographic data, user interest, combinations of them, and the like. In some implementations, the users can provide respective data to the central computer system 100 with the respective requests to form associations. In this manner, the central computer system 100 can create the network 150 including the multiple users and store data associated with each of the multiple users. The network 150 of users may not have existed until the central computer system 100 created the network 150.

Figure 2:
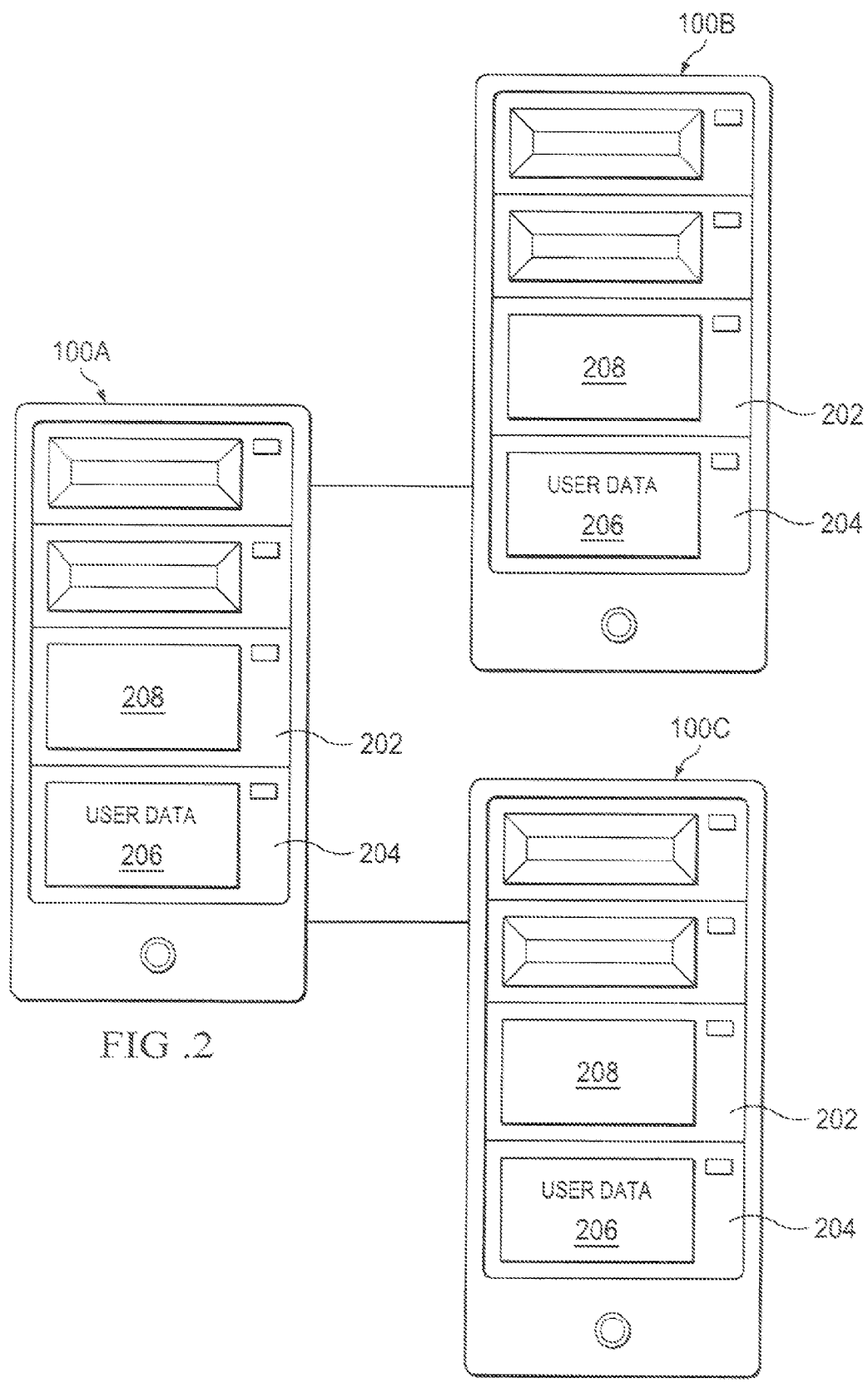
FIG. 2 illustrates an example computer system associated with a central entity.

FIG. 2 illustrates an example central computer system 100 associated with a central entity. The central computer system 100 executes one or more computer software applications 202 that include computer software instructions stored on a computer-readable medium 204 and executed by data processing apparatus 208. A size and scale of the central computer system 100 can vary based on a type of the central entity with which the central computer system 100 is associated. For example, if the central entity is an event scheduled to occur at a geographical location and to be attended by several users (for example, several hundreds of users), then the central computer system 100 can include a server system that includes multiple computer systems that collectively store computer program instructions on one or more computer-readable media and execute the instructions using data processing apparatus physically located on one or more of the multiple computer systems to perform operations described here. For example, one or more administrators of the central computer system 100 can access the system 100 using a respective computer—for example, a desktop computer, a laptop computer, a mobile device, and the like—to provide instructions to execute the application.

Alternatively, if the central entity is a person organizing a meeting with friends, then the central computer system 100 can be a desktop computer, a laptop computer, and the like, that can store the computer program instructions on a computer-readable medium, for example, a hard disk, and execute the instructions using data processing apparatus installed in the system 100. In some implementations, the size and scale of the central computer system 100 can be independent of the nature of the central entity. For example, where the central entity is a person, the central computer system 100 can be the server system.

In some implementations, after having formed the network 150, the central computer system 100 can detect that each user of a subset of users of the network has performed a common operation at the central computer system 100. For example, a first user of the first user system 102, who has previously registered with the central computer system 100 to attend an event at a central entity, can "check-in" to the event at a time after registering but before the time at which the event is scheduled to occur. For example, using the first computer system 102 or a mobile device that executes a version of the computer software application 202, the first user can access a website of the event and select a "check-in" option presented in a webpage of the website. In similar manner, a subset of users that includes less than or all users of the network 150 can each "check-in" to the event, thereby performing a common operation. In some situations, all users of the network 150 can "check-in" to the event.

The central computer system 100 can provide to each user of the subset of users, at least a portion of data associated with at least one other user of the subset in response to detecting that each user of the subset has performed the common operation. As described below with reference to FIGS. 3A-3E, the central computer system 100 can display user interfaces on the user systems of each user in the subset, and, through the user interfaces, can provide at least the portion of data associated with at least one other user. For example, the central computer system 100 can display the identities of each user in the network 150 (FIG. 3A), distances between a physical location of each user's computer system and the central entity (FIG. 3B), a geographical location of each user in a map (FIG. 3C), and actions that each user can perform using a respective user system (FIG. 3D). The central computer system 100 can determine each item of data that is displayed in the user interfaces from the data associated with the users in the network 150.

FIGS. 3A-3D illustrate respective example user interfaces presented to users connected to the central entity. In some implementations, the central computer system 100 can generate each of the user interfaces shown in FIGS. 3A-3D by executing computer-implemented methods described below, and present each of the user interfaces on one or more or all of the user computer systems in the network 150 either automatically or in response to receiving a request for a user interface from a user computer system or both. In some situations, a user computer system using which a user provided a request to form an association with the central entity may be different from a user computer system using which the user, who is associated with the central entity, accesses the central computer system 100. Nevertheless, the central computer system 100 can transmit the user interfaces described below to be displayed on any user computer system as long as the user of the user computer system has formed the association with the central entity and is authorized to access the central computer system 100 and the network 150. In some implementations, when the user forms the association, the central entity can provide the user with authorizing information—for example, a log-in name and a password—which the user can use to access the central computer system 100 using any user computer system.

Figure 3A:
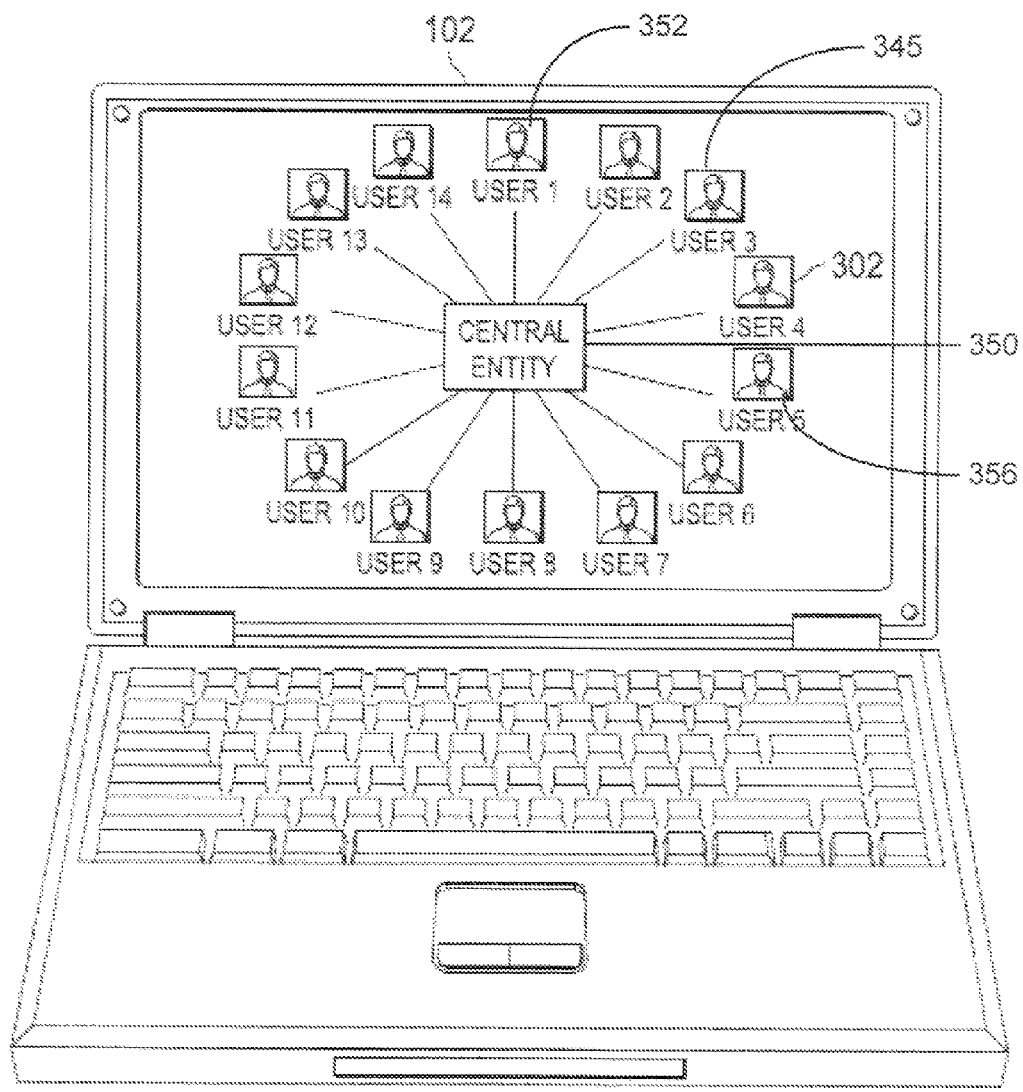
FIGS. 3A-3D illustrate respective example user interfaces presented on the computer systems connected to the central entity.

FIG. 3A shows an example of a first user interface 302 that the central computer system 100 generates and displays in a display device connected to the first user computer system 102. The central computer system 100 can generate the first user interface 102 to display multiple objects—for example, a first object 352, a second object 345, a third object 356, and the like—connected to a common object 350. Each of the multiple objects can represent a user of the network that the central computer system 100 formed in response receiving multiple requests to form associations with the central entity. The common object 350 can represent the central entity. As described below, the central computer system 100 can display each object as a selectable control object, a selection of which causes the central computer system 100 to perform operations.

In an example in which the central entity is a convention center and the event associated with the central entity is a conference proceeding scheduled to occur at the convention center, the central computer system 100 can display the common object 350 as an icon in which the central computer system 100 can display an image of the convention center or an image associated with the conference proceeding or a combination of them. Similarly, the central computer system 100 can display each of the multiple objects as a respective icon. In each object, the central computer system 100 can display an image associated with each user of the network. For example, the central computer system 100 can display an image of each user, which the central computer system 100 can have received with the data describing the user. In addition, the central computer system 100 can display data describing a user adjacent to an object representing the user. The data can include, for example, a name associated with the user, a distance between the user and the central entity (determined as described below with reference to FIG. 3B), and the like. The data can additionally include, for example, a time that it will take for the user to arrive at the central entity, determined based on the distance. Further, the time can be periodically updated based on updates to the user's location and consequently the distance. Each of the multiple objects can be displayed as being connected to the common object 350, for example, by a line (solid or dotted) with or without terminal arrows. Alternatively, or in addition, any other visual representation can be used to communicate the connection between each of the multiple objects and the common object 350.

In some implementations, the central computer system 100 can be configured to generate the first user interface 302 when the first user of the first user computer system 100 provides a first request to form an association with the central entity. In such implementations, the first user interface 302 can include the common object 350 and an object representing the first user. As additional requests to form additional associations are received from additional users, the central computer system 100 can update the first user interface 302 to display additional objects that represent the additional users. By doing so, the first user interface 302 can visually communicate an increase in connections as additional associations are formed. In some implementations, the central computer system 100 can be configured to generate the first user interface 302 after all the users have formed respective associations. For example, the central computer system 100 can generate the first user interface 302 after a deadline to register for the conference proceedings has expired as additional users may not be added to the network once the deadline has expired.

Figure 3B:
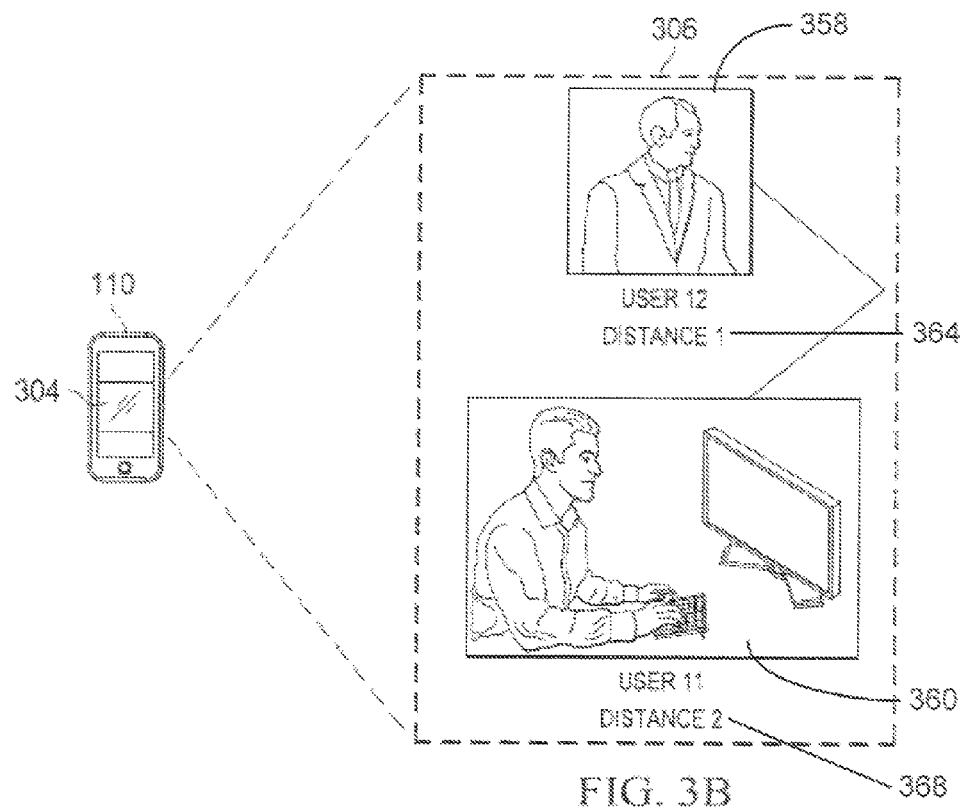

FIG. 3B shows an example of a second user interface 306 that the central computer system 100 generates and displays in a display device connected to the fifth user computer system 110, which can be, for example, a smart phone having a display area 304. In the second user interface 306, the central computer system 100 can display objects representing a subset of the users of the network 150. In the example second user interface 306 shown in FIG. 3B, the central computer system 100 displays a first object 358 and a second object 360 representing a first user and a second user, respectively. Within the first object 358 and the second object 360, the central computer system 100 displays an image associated with the first user and the second user, respectively. For example, the first user can have provided an image of the user or another image with the data describing the first user. The central computer system 100 can display a version of the image in the first object 358. The version can be a scaled down version or a low-resolution version of the image that the user provided.

In some implementations, the central computer system 100 can display a first distance 364 and a second distance 368 between the first user and the second user, respectively, and the central entity. For example, the central computer system 100 can display the distances adjacent to the respective objects, such as, below, above, or to the right or left of the objects. Methods using which the central computer system 100 can determine the first distance 364 and the second distance 362 are described below.

In some implementations, the example second user interface 306 shown in FIG. 3B is a portion of the example first user interface 302 shown in FIG. 3A. Whereas the user interface 302 shows all the users in the network 150, the user interface 304 shows fewer than all the users. In some implementations, the central computer system 100 can display the first user interface 302, which displays all users of the network, in the display area 304 of the fifth computer system 100. The central computer system 100 can receive an input to display only a portion of the first user interface 302, for example, in the form of a touch input or using an input device such as a keyboard or stylus (not shown). In response, the central computer system 100 can generate and display the second user interface 306 in place of the first user interface 302.

In some implementations, the central computer system 100 can generate and display the second user interface 306 in the display area 304, for example, in response to receiving a request from the user of the fifth computer system 110 to display a user interface that shows specific users, such as the first user and the second user. As described above, the central computer system 100 can configure each object in the first user interface 302 to be a selectable control object, a selection of which performs functions. For example, upon viewing the first user interface 302, the user of the fifth computer system 110 can select the first object 358 and the second object 360. To do so, the user can provide any type of input using, for example, a touch screen, keyboard, cursor, voice, and the like.

The central computer system 100 can determine the selection of the two objects to be an input to filter the first user interface 302 to display only the first object 358 and the second object 360. In response, the client computer system 100 can generate and display the second user interface 306 in the display area 304 in place of the first user interface 302. In this manner, in response to user input, the central computer system 100 can generate multiple user interfaces, each of which displays less than all of the objects in the first user interface 302. Because the second user interface 306 includes fewer objects than the first user interface 302, more display area is available to display the first object 358 and the second object 360 in the second user interface 306 relative to the first user interface 302. Consequently, the central computer system 100 can display more data describing each user in the second user interface 306 relative to the first user interface 302.

Figure 3C:
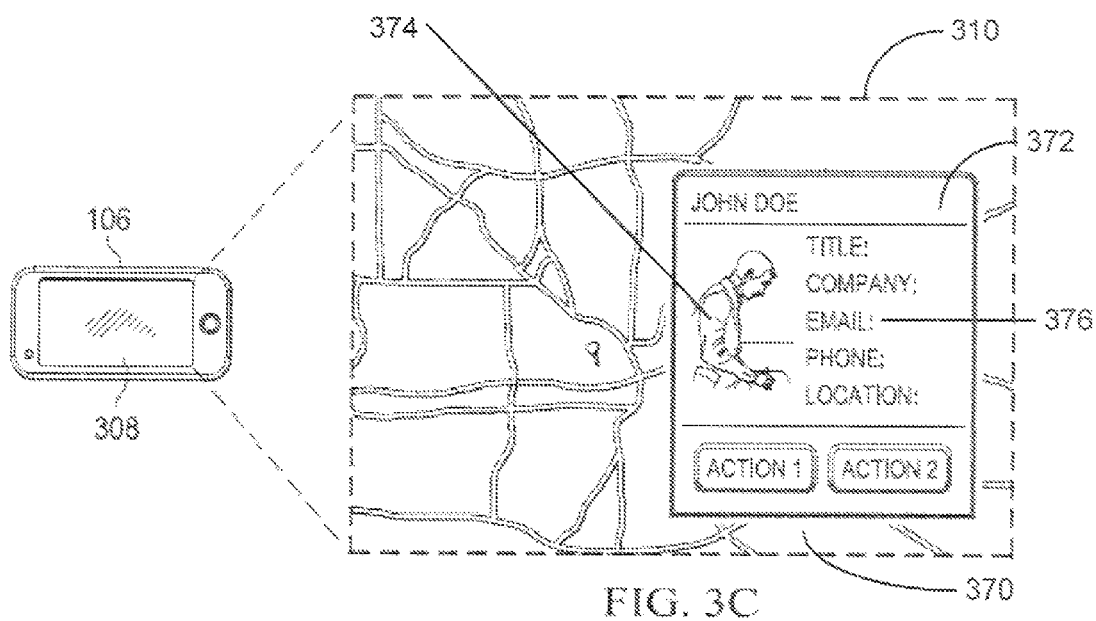
Figure 3D:
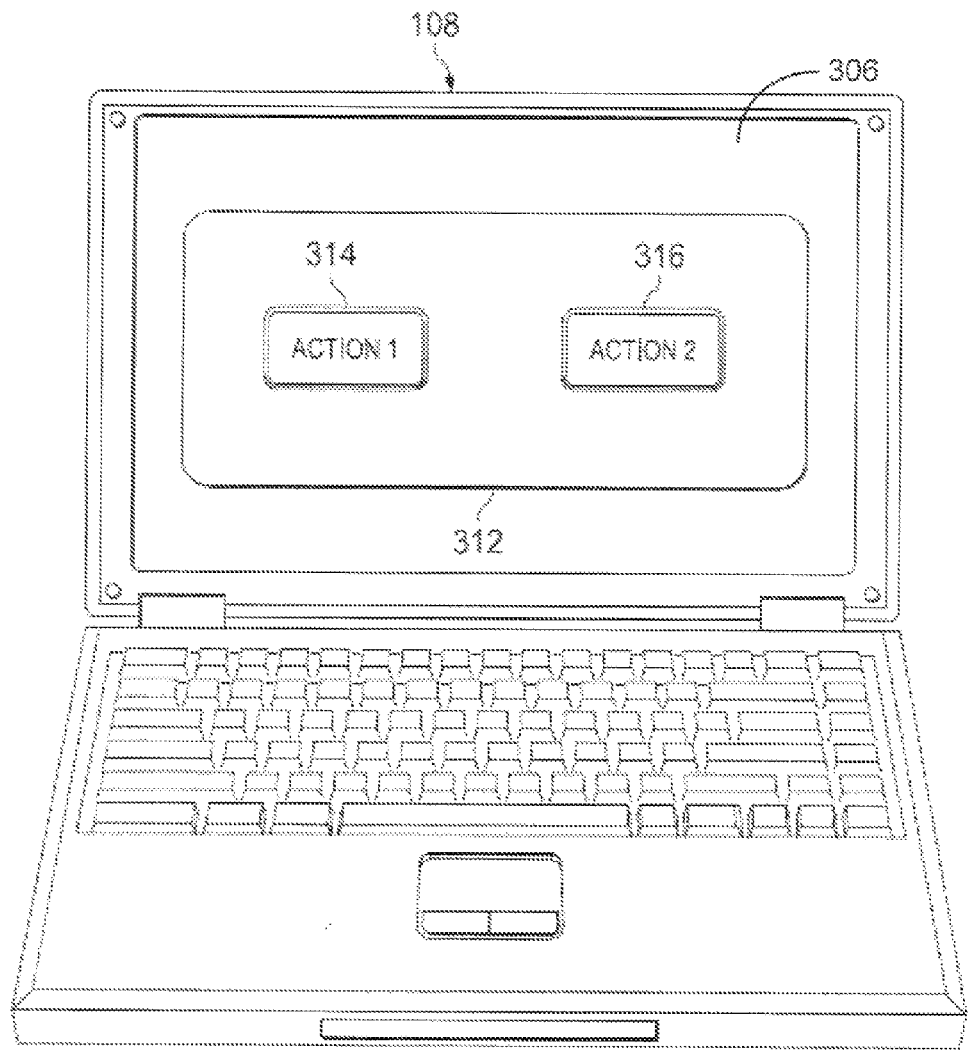

FIG. 3C shows an example of a third user interface 310 that the central computer system 100 generates and displays in a display device connected to the third user computer system 106, which can be, for example, a tablet computer having a display area 308. In the third user interface 310, the central computer system 100 can display a map object 370 that is a map showing a geographic location associated with a user, for example, the first user represented by the first object 358 (FIG. 3B). For example, when the central computer system 100 displays the first user interface 302 in the display area 308 of the third user computer system 106, a user can select the first object 358. In response, the central computer system 100 can display one or more actions that can be performed, which can include a mapping action. The central computer system 100 can detect a selection of the mapping action. In response, the central computer system 100 can identify the geographic location associated with the first user and provide the geographic location to another computer system (not shown) that executes a computer software application configured to generate an image of a map and include an object representing the geographic location in the map. The central computer system 100 can receive and display the image in the map object 370.

The central computer system 100 can obtain the geographic location of the first user in several ways. In one example, the central computer system 100 can retrieve the geographic location from the data describing the first user. In another example, the third computer system 106 can be configured to transmit its location, for example, using a GPS device installed in the third computer system 106. When the first user uses the third computer system 106 to access the central computer system 100 and, in some situations, provides permission to track the location of the third computer system 106, then the central computer system 100 can determine that the geographic location of the third computer system 106 is the location of the first user. In some implementations, the system 100 can obtain the geographic location based on an Internet Protocol (IP) address of the third computer system 106 or an address of a router through which data is transmitted to the third computer system 106 or both. In some implementations, the system 100 can obtain the geographic location when the third computer system 106 connects to public Application Programming Interface (API) offered by servers connected to the Internet.

As described above, the central computer system 100 can display a distance between a user and the central entity or between two users in the first user interface 302 and in other user interfaces. To determine the distance between, for example, a user and the central entity, the central computer system 100 can provide respective geographic location of the user and of the central entity to a separate computer software application that can determine distances. The central computer system 100 can receive determined distances and display them in the user interfaces. In implementations in which the central computer system 100 receives the geographic location from a GPS device installed on a user computer system, the central computer system 100 can periodically provide the location received from the user computer system to the separate computer software location and periodically receive the distance between the user computer system and the central entity. By doing so, the central computer system 100 can periodically update the distance of the user computer system in the generated user interfaces, thereby allowing one or more users or the central entity (or both) to track the location of the user computer system.

The central computer system 100 can display the map object 370 as a layer in the display area 308, and can display another object 372 over the map object 370 and adjacent to the object in the map object 370 that represents the geographic location. In this other object 372, the central computer system 100 can display data describing the first user including, for example, the first user's name, an image 374 of the first user, contact information 376 for the first user, and the like. The central computer system 100 can obtain the data from the data describing the first user. In some implementations, the image 374 of the first user can be the image displayed in an object representing the first user in the first user interface 302. In addition, the central computer system 100 can provide functionalities to hide all or some of the data shown in the other object 372.

In some implementations, another user (for example, the second user) can access the central computer system 100 using another user computer system (not shown), and select the first object 358 representing the first user from the first user interface 302. By implementing methods similar to those described above, the central computer system 100 can display a geographic location of the first user and data describing the first user to the second user in a display area of the other computer system. In this manner, the central computer system 100 can display a geographic location of any user connected to the network 150 to any other user connected to the network 150.

In some implementations, the central computer system 100 can generate a fourth user interface (not shown) that the central computer system 100 generates and displays in the display device connected to the third user computer system 106. As described above, the central computer system 100 can obtain the geographic location of a user or of a user computer system or both with data describing the user or the central entity, provide the geographic locations to the separate computer system that can determine distances, and receive multiple distances a distance between a user and the central entity, and a distance between two users. As described below, the central computer system 100 can execute a filtering operation to identify users that are within a pre-defined distance from the central entity. For example, the central computer system 100 can request an input for a pre-defined distance either from the central entity. Upon receiving the pre-defined distance, the central computer system 100 can identify one or more users of the network that are within the pre-defined distance from the central entity, for example, by comparing the distances received from the separate computer system. The central computer system 100 can display the fourth user interface that displays objects representing only those users whose geographic location is within the pre-defined distance from the central entity. In some implementations, the central computer system 100 can display a visual indicator, for example, a highlighting around an object, which allows a viewer of the user interface to visually discern the objects representing users who are within the pre-defined distance.

In some implementations, the central computer system 100 can display the first user interface 302 in a user computer system. Through the user computer system, a user can select one or more objects representing one or more respective users. In this manner, the user can form a subset of users of the network 150. The central computer system 100 can additionally receive a pre-defined distance from the user through the user computer system. Subsequently, when the central computer system 100 determines that one or more users of the subset are within a pre-defined distance, either from the central entity or from the user, then the central computer system 100 can display the visual indicator around the one or more objects representing the one or more users determined as being within the pre-defined distance.

Figure 4:
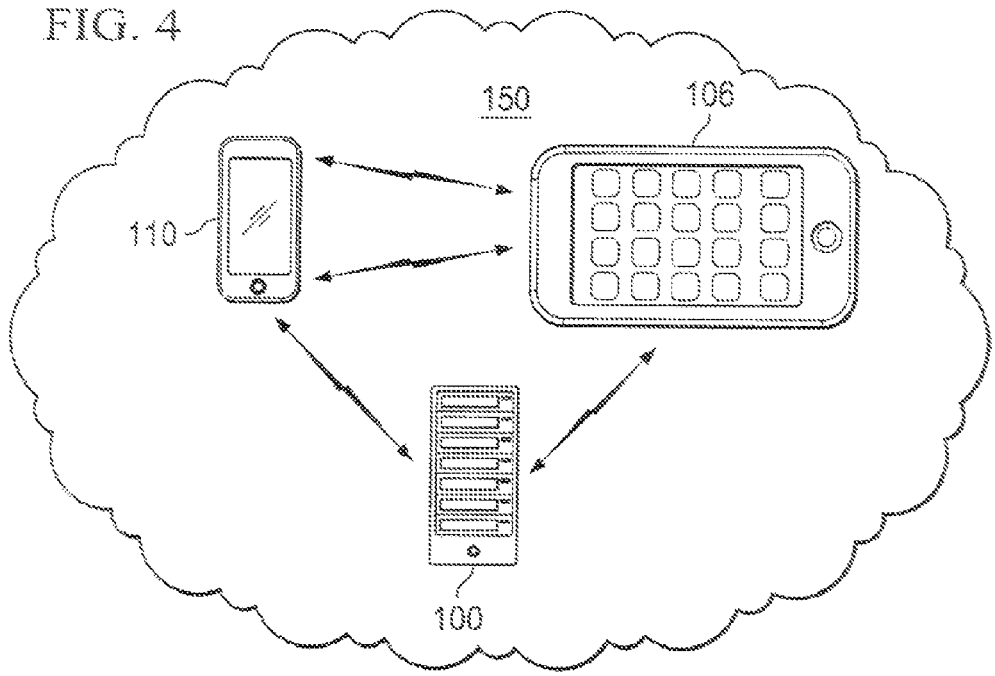
FIG. 4 illustrates a connection formed between two computer systems by the computer system associated with the central entity.

FIG. 3D shows an example of a fifth user interface 306 that the central computer system 100 generates and displays in a display device connected to the fourth user computer system 108, which can be, for example, a laptop computer. In the fifth user interface 306, the central computer system 100 can display a layer 312, and over the layer 312, display selectable control objects, for example, a first control object 314 and a second control object 316, that each represents an action that the central computer system 100 can allow a user computer system to implement. Within each selectable control object, the central computer system 100 can display a description of the action, for example, "Action 1" in object 314 and "Action 2" in object 316. The actions can include, for example, exchange of communications between a user computer system and the central computer system 100, for example, e-mail, text messages, and the like. In this manner, the central computer system 100 can implement functionalities that allow user computer systems, for example, the third computer system 106 and the fifth computer system 110 to communicate with the central computer system 100 and with each other (FIG. 4). By doing so, the central computer system 100 can enable the third computer system 106 and the fifth computer system 110 to receive and send communications from and to not only the central computer system 100 but also each other.

Figure 5:
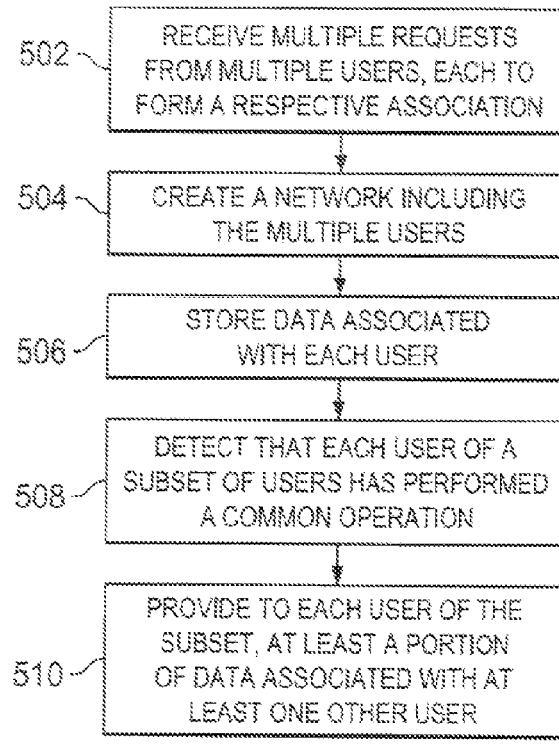
FIG. 5 is a flowchart of an example process for connecting computer systems to a central entity.

FIG. 5 is a flowchart of an example process 500 for connecting computer systems to a central entity. At 502, multiple requests are received from multiple users, for example, at the central computer system 100. Each request is a request to form a respective association with the central computer system 100. Each request includes data associated with a respective user of the multiple users. At 504, a network including the multiple users is created at the central computer system 100 in response to receiving the multiple requests. At 506, data associated with each user of the multiple users is stored at the central computer system 100. At 508, it is detected that each user of a subset of users has performed a common operation at the central computer system 100. At 510, at least a portion of data associated with at least one other user is provided to at least one other user in the subset in response to the detecting.

Figure 6:
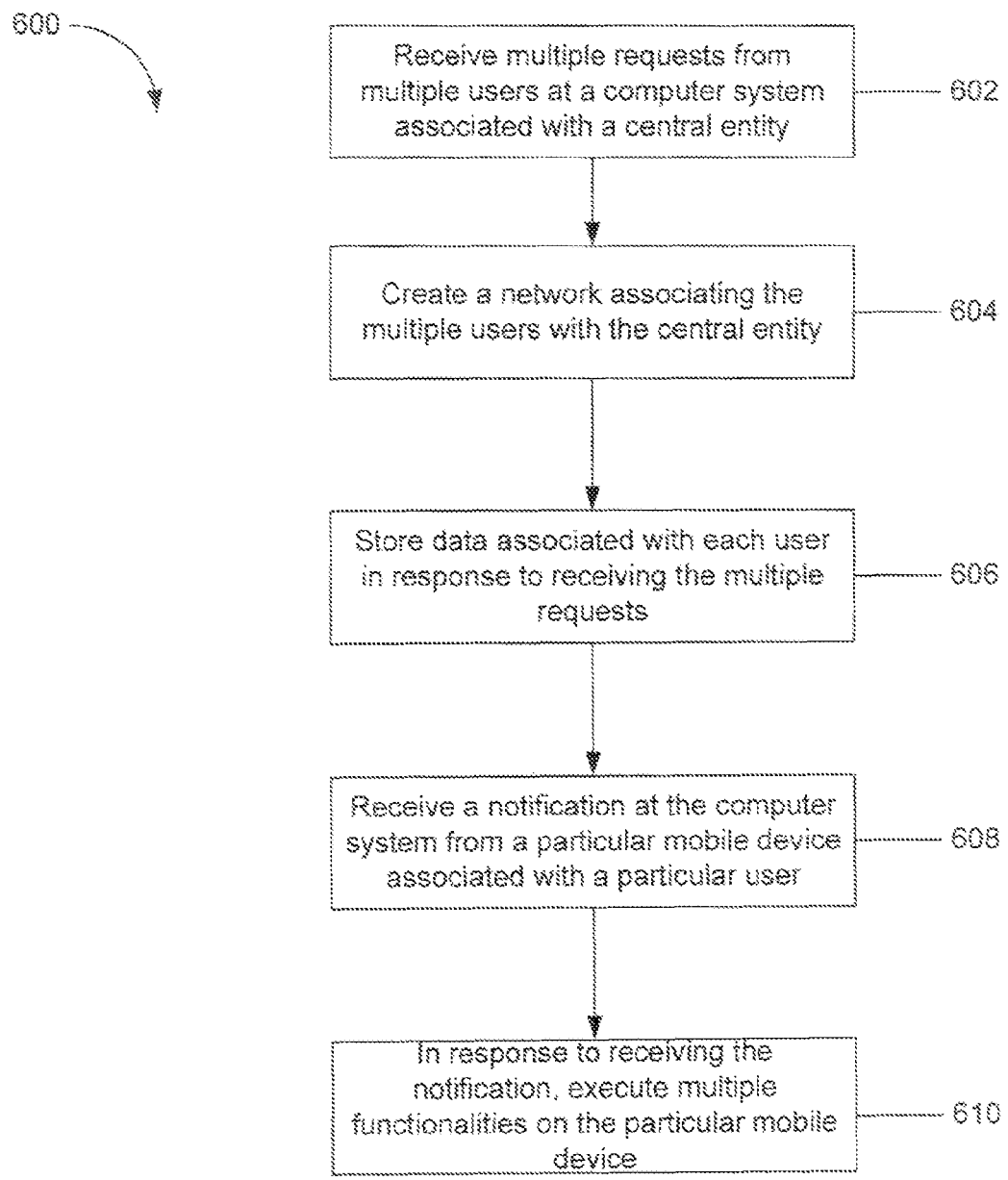
FIG. 6 is a flowchart of another example process for connecting computer systems to a central entity.

FIG. 6 is a flowchart of another example process 600 for connecting computer systems to a central entity. At 602, multiple requests are received from multiple users at a computer system associated with a central entity, for example, the central computer system 100. Each request is a request to form a respective association with the central entity. Each request includes data associated with a respective user. Each user is associated with a respective mobile device. At 604, a network associating the multiple users with the central entity is created in response to receiving the multiple requests. Also, at 606, data associated with each user is stored in response to receiving the multiple requests. At 608, a notification is received at the computer system from a particular mobile device associated with a particular user of a subset of users of the network. The notification triggers a connection between the computer system and the particular mobile device. At 610, in response to receiving the notification, multiple functionalities are executed on the particular mobile device. The multiple functionalities communicate at least a portion of data associated with at least one other user of the subset to the particular user.

The central computer system 100 can generate the user interfaces described here for display in any type of user computer system including, for example, a desktop computer, a laptop computer, a mobile device, and the like. In some implementations, the central computer system 100 can generate several versions of each user interface, for example, high resolution interface, a low resolution interface, interfaces of different sizes, and the like. A version of the user interface that the central computer system 100 provides to a user computer system can depend on factors including, for example, the type of the user computer system, the type of network connection that connects a user computer system to the central computer system 100, and the like.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (e.g., multiple CDs, disks, or other storage devices).

The operations described in this specification can be implemented as operations performed by a data processing apparatus, for example, data processing apparatus 108, on data stored on one or more computer-readable storage devices or received from other sources. The subject matter described here can be implemented in a cloud computing environment. For example, the requests from client devices to form associations with the central entity can be received over a cloud to which the client devices and the central entity are connected. In addition, the requests, the user data, and data generated by the central entity can be stored in the cloud.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network, for example, network 126. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
receiving, at a computer system, a plurality of requests from a corresponding plurality of users, each request to form a respective association with the computer system, and wherein each request includes data associated with a respective user of the plurality of users, wherein the computer system is associated with a central entity to which each user of the plurality of users sends each request to form the respective association, wherein the central entity is an event scheduled to occur at a geographic location;
creating, at the computer system, a network including the plurality of users in response to receiving the plurality of requests;
storing, at the computer system, data associated with each user of the plurality of users;
detecting that each user of a subset of users of the network has performed a common operation at the computer system, wherein the common operation includes transmitting a registration request using a mobile device to the computer system associated with the central entity;
providing, to at least one user of the subset of users, at least a portion of data associated with at least one other user of the subset in response to the detecting;
determining that a first user and a second user have transmitted respective registration requests to the computer system;
displaying, on a mobile device associated with the first user, a first distance of the first user and a second distance of the second user from a common geographic location; and
terminating the network after an expiration of the event.

2. The method of claim 1, further comprising executing, on a first computer system associated with a first user, a functionality to transmit communications to and receive communications from a second computer system associated with a second user.

3. The method of claim 1, further comprising:
generating, at the computer system, a user interface that displays a plurality of objects connected to a common object, wherein each of the plurality of objects represents a user of the network;
providing the user interface in response to receiving a request for the user interface from a mobile device of a user of the network; and
displaying an image associated with each user in a respective object that represents each user.

4. The method of claim 1, further comprising presenting, to a particular user in the network, an advertisement selected based on stored data associated with the particular user.

5. The method of claim 1, wherein the data associated with each user includes one or more of an age, a geographic location, demographic data, or user interest.

6. A non-transitory computer-readable medium tangibly encoding computer program instructions executable by data processing apparatus to perform operations comprising:
receiving, at a computer system associated with a central entity, a plurality of requests from a respective plurality of users, each request to form a respective association with the central entity, wherein each request includes data associated with a respective user, and wherein each user is associated with a respective mobile device, wherein the central entity is an event scheduled to occur at a geographical location and wherein a request from the particular user to form a respective association with the central entity includes a request from the particular user to register for the event;
in response to receiving the plurality of requests:
creating, at the computer system, a network associating the plurality of users with the central entity, and
storing, at the computer system, data associated with each user of the plurality of users;
receiving, at the computer system, a notification from a particular mobile device associated with a particular user of a subset of users of the network, the notification triggering a connection between the computer system and the particular mobile device, wherein a notification from the particular mobile device associated with the particular user includes a notification to check-in the registered particular user to the event;
in response to receiving the notification, executing, by the computer system, a plurality of functionalities on the particular mobile device, wherein the plurality of functionalities communicate at least a portion of data associated with at least one other user of the subset to the particular user;

detecting, at the computer system, a termination event at the central entity, wherein the termination event is an end of the event; and terminating the network in response to detecting the termination event.

7. The medium of claim 6, wherein the operations further comprise:

determining that a first user and a second user have each transmitted a respective request to form a respective association with the central entity; and displaying, on a first mobile device associated with the first user, a first distance of the first user and a second distance of the second user from the central entity.

8. The medium of claim 7, wherein the operations further comprise executing, on the first mobile device, a functionality to transmit communications to and receive communications from a second mobile device associated with the second user.

9. The medium of claim 6, wherein the data associated with each user includes one or more of an age, a geographic location, demographic data, or user interest.

10. A system comprising:

one or more data processing apparatus; and a non-transitory computer-readable medium tangibly encoding computer program instructions executable by the one or more data processing apparatus to perform operations comprising:

receiving, at a computer system a plurality of requests from a corresponding plurality of users, each request to form a respective association with the computer system, and wherein each request includes data associated with a respective user of the plurality of users, wherein the computer system is associated with a central entity to which each user of the plurality of users sends each request to form the respective association and wherein the central entity is an event scheduled to occur at a geographic location;

creating, at the computer system, a network including the plurality of users in response to receiving the plurality of requests;

storing, at the computer system, data associated with each user of the plurality of users;

detecting that each user of a subset of users of the network has performed a common operation at the computer system, wherein the common operation includes transmitting a registration request using a mobile device to the computer system associated with the central entity; and providing, to at least one user of the subset of users, at least a portion of data associated with at least one other user of the subset in response to the detecting;

determining that a first user and a second user have transmitted respective registration requests to the computer system;

displaying, on a mobile device associated with the first user, a first distance of the first user and a second distance of the second user from a common geographic location; and terminating the network after an expiration of the event.

11. The system of claim 10, wherein the operations further comprise:

generating, at the computer system, a user interface that displays a plurality of objects connected to a common object, wherein each of the plurality of objects represents a user of the network;

providing the user interface in response to receiving a request for the user interface from a mobile device of a user of the network; and displaying an image associated with each user in a respective object that represents each user.

* * * * *